US006381228B1

(12) United States Patent
Prieto, Jr. et al.

(10) Patent No.: US 6,381,228 B1
(45) Date of Patent: Apr. 30, 2002

(54) ONBOARD CONTROL OF DEMAND ASSIGNED MULTIPLE ACCESS PROTOCOL FOR SATELLITE ATM NETWORKS

(75) Inventors: Jaime L. Prieto, Jr., Torrance; Jason R. Kincaid, Redondo Beach, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/232,155

(22) Filed: Jan. 15, 1999

(51) Int. Cl.[7] .............................................. H04B 7/212
(52) U.S. Cl. ....................... 370/323; 370/443; 370/444; 370/447
(58) Field of Search ................................ 370/277, 278, 370/282, 442–463, 315, 316, 321–323

(56) References Cited

U.S. PATENT DOCUMENTS

| | | | | |
|---|---|---|---|---|
| 4,491,947 A | * | 1/1985 | Frank .......................... | 370/323 |
| 5,003,534 A | * | 3/1991 | Gerhardt et al. ............ | 370/322 |
| 5,392,450 A | * | 2/1995 | Nossen ....................... | 370/321 |

OTHER PUBLICATIONS

Bennett, Jon C. R., et al. "Hierarchical Packet Fair Queuing Algorithms," Proc. of the ACM–Sigcomm 96, Palo Alto, CA, Aug. 1996, pp. 143–156.

Varma, Anujan, et al., "Hardware Implementation of Fair Queuing Algorithms for Asynchronous Transfer Mode Networks," IEEE Communications Magazine, Dec. 1997, pp. 54–68.

Chiussi, Fabio M. et al., "Implementing Fair Queueing in ATM Switches—Part 2: The Logarithmic Calendar Queue," IEEE Globecom 97, Phoenix, AZ, Nov. 1997.

Gelenbe, Erol, et al. "Diffusion based statistical call admission control in ATM," Performance Evaluation 27 & 28 (1996) pp. 411–436.

Zhang, Hui, "Service Disciplines for Guaranteed Performance Service in Packet–Switching Networks," Proceedings of the IEEE, vol. 83, No. 10, Oct. 1995.

Gelenbe, Erol, et al. "Bandwidth Allocation and Call Admission Control in High–Speed Networks," IEEE Communications Magazine, May 1977, pp. 122–129.

* cited by examiner

*Primary Examiner*—Salvatore Cangialosi
(74) *Attorney, Agent, or Firm*—Harness, Dickey & Pierce

(57) ABSTRACT

An onboard DAMA protocol for use in connection with a processing satellite communications network, where multiple users are assigned to a common transmission resource as part of a sharing set. A media access controller (30) on the satellite maintains a reservation log which identifies the frequencies and number of uplink time slots in the resource that are currently reserved by one or more members of the sharing set. To reserve a time-frequency slot on the transmission resource for a non-contentious transmission of data, a user of the sharing set will transmit a reservation request to the satellite on a contentious uplink resource. If a return message is not received, the user knows that the reservation request collided with another reservation request, and a retransmission strategy of the reservation request is employed. When the media access controller (30) receives the reservation request, it decides whether to grant, deny or delay the request based on the service and price class of the user, the amount of data already sent by the user, the number and type of other users with reservation requests in the queue, and the congestion state of the destination downlink port and subsequent nodes in the network. When the user receives a reservation grant message from the media access controller (30) on the satellite in the downlink, it will then wait for its reservation time frequency slot, and transmit its data in a non-contentious basis on the transmission resource at that time. If the user needs additional bandwidth to transmit more data, it may piggyback a reservation request on the data transfer.

26 Claims, 5 Drawing Sheets

ONBOARD CONTROL OF DEMAND ASSIGNED MULTIPLE ACCESS PROTOCOL FOR SATELLITE ATM NETWORKS

BACKGROUND OF THE INVENTION

1. Field of the Invention

This invention relates generally to a demand assigned multiple access protocol for use in a satellite communications system and, more particularly, to an onboard demand assigned multiple access protocol for use in connection with a processing satellite communications network that allows multiple users to efficiently use a common uplink transmission resource.

2. Discussion of the Related Art

Various communications systems, such as Ka-Band Satellite Processing Communications networks, employ processing satellites orbiting the Earth in a geosynchronous orbit. As is known in the art, processing satellites provide the transfer of data between user terminals at ground stations on the Earth. Data is transmitted to the satellite from the user terminals on a satellite uplink. The uplink signals are transmitted on various available channel slots that are separated in frequency and time. The data that is transmitted on the channel slots is usually packaged into separate ATM (asynchronous transfer mode) data cells. The ATM cells are demodulated, decoded and switched at the processing satellite, and then transmitted back to the Earth on a satellite downlink to the destination. A suitable antenna system is provided on the satellite to receive the uplink signals and transmit the downlink signals over a predetermined coverage area on the Earth.

A requirement for processing communications satellite networks is the need to regulate access to the satellite for a multitude of bursty users, for example, a set of intra-corporate, inter-site local area network (LAN) interconnections or Web browsing users (which display bursty traffic characteristics), who mutually share the uplink. In other words, a predetermined protocol is required to allow the many users of the network to gain access to the satellite on the uplink without interfering with each other. Typically, a bursty user, such as a user surfing the Web, requires a high peak transmission rate to minimize response time, but at a low average rate, i.e., duty cycle, due to a long idle period between transmissions. An example of this type of bursty transaction is Web Surfing, where the user "mouse-click's" on a Web link, waits impatiently for the network to transfer the page to the local computer (high rate requirement for low delay), and then the user reads and thinks about the Web Page on the computer screen before going to the next Web link (the think-time results in a low average rate). If a dedicated uplink transmission resource (TR) were allocated to each user at the peak rate, then the average usage of the TR, i.e., the actual bits which are billable, or the actual usage, i.e., the average rate of the resource, is low because of the low duty cycle. A TR is a series of channel slots available for transmitting data on a transmission uplink path at a certain bandwidth. To solve the above-described problem, demand assigned multiple access (DAMA) protocols have been designed to improve the usage efficiency of the available uplink TRs by allowing several users to share the same uplink TR. In other words, to provide a more efficient usage of the available TRs, multiple users share the same uplink bandwidth. In general, DAMA protocols involve trading data throughput efficiency against delay, while maintaining a required quality-of-service (QoS) performance. One of the first DAMA protocols is generally known as "Slotted Aloha," where the multiple users of the common TR compete for resource usage. In the Slotted Aloha technique over a fully processed satellite, any of the several users of the same TR would transmit data on the uplink whenever they desired. If another user of the same resource also transmitted data at the same time, the two uplink signals would collide in the satellite, resulting in garbled data is unusable onboard. The transmitting user detects a collision by the absence of the acknowledgment on the downlink within a predetermined time i.e., detected by timeout. In order to prevent subsequent immediate collisions by the same two users, the delay of the retransmission for each user was randomized. Although the Slotted Aloha method does increase the usage efficiency of the TRs by statistically multiplexing the uplink TR, there is a significant potential for collisions when multiple users simultaneously access the uplink, necessitating retransmission and resulting in concomitant delay by all of the users.

To limit the number of collisions, improved DAMA techniques were devised, generally referred to a reservation DAMAs. In a reservation DAMA protocol, the uplink traffic is separated into a main flow where coordinated non-contentious access is provided for user data through a reservation procedure, and a control flow which uses the contentious Slotted Aloha technique, but only for reservation requests. The reservation procedure works by specifically reserving a particular slot in the uplink TR prior to actually transmitting the desired data. By reserving particular channel slots for transmitting data on the main flow TR, the chance of a collision between users is removed. Collisions are therefore limited to the lower rate control flow resulting in a much higher usable throughput for the main flow of data. For processing satellite networks, there can be three general variations of the reservation DAMA technique, depending on where the reservations are controlled. Particularly, the reservations can be controlled at a central terrestrial location, often referred to as a network operations center (NOC), onboard the processing satellite itself, or distributed among the set of users using the TR. The first approach is usable for bent-pipe and processing satellites, and is currently in use in very small aperture terminal (VSAT) networks. However, this approach has the disadvantages that a heavy processing load to control the DAMA protocol may occur at the NOC, and two trips to the satellite are required for each reservation request, thus resulting in extra delay and increased overhead usage of the TR that is wasted bandwidth because it is not "billable." The third approach is the subject of U.S. patent application Ser. No. 09/162,514, filed Sep. 29, 1998, titled "Distributed Control DAMA Protocol For Use With A Processing Communications Satellite," assigned to the assignee of the instant application.

What is needed is an uplink TR allocation technique that allows multiple bursty users to efficiently use a common uplink transmission resource in an efficient manner that avoids collisions between sharing users and conserves system resources. It is therefore an object of the present invention to provide such a technique.

SUMMARY OF THE INVENTION

In accordance with the teachings of the present invention, an onboard DAMA protocol is disclosed for use in connection with a processing satellite communications network, where multiple users are assigned to a common transmission resource as part of a sharing set. A media access controller on the satellite maintains a reservation log which identifies the uplink time slots in the resource that are currently reserved by the members of the sharing set and allows the members of the sharing set to reserve the available time slots. To reserve a time slot on the transmission resource for a non-contentious transmission of data, a user of the sharing set will transmit a reservation request to the satellite on a contentious uplink resource. The reservation request includes the amount of data to be sent. If a return message is not received, the user knows that the reservation request collided with another reservation request, and a retransmission strategy of the reservation request is employed.

When the onboard media access controller receives the reservation request, it decides whether to grant, deny or delay the request based on predetermined criteria, including the service and price class of the user, the amount of data already recently sent by the user, the number of other users with reservation requests in the queue, and the congestion state of the destination downlink port. The media access controller issues a reservation grant message to the requesting user that includes the time, frequencies and length to send the data. When the user receives the reservation grant message, it will then wait for its reserved time slot, and will then transmit its data in a non-contentious basis on the main flow TR at that time. If the user needs additional resources to transmit more data than was originally requested, it may "piggyback" a next reservation request on the data transfer.

The media access controller uses a hierarchical uplink fair scheduling technique to determine when available bandwidth will be assigned to a particular user based on a packet fair queuing (PFQ) algorithm. In a first stage, a particular wholesaler is selected based on the PFQ algorithm, and then retailers associated with the selected wholesaler are selected in a particular order in a second stage based on the PFQ algorithm to determine the priority of data transfer.

The media access controller receives data from other processors in the satellite to monitor network traffic and congestion at the various destination ports to determine whether the reservation request will be granted, delayed or denied. A real-time bandwidth estimator module is provided to determine the effective or equivalent available bandwidth capacity for each downlink from the satellite. Additionally, a flow-control module is provided that senses congestion at the various destination ports serviced by the network (internal and external to the satellite). A call processor module monitors the entire transmission of data throughout the network, and provides congestion information to the flow-control module. The call processor knows the topology of the network (e.g. through the private network-to-network interface (PNNI) protocol), enabling it to re-route calls through alternate paths to a destination. An available bit-rate module calculates the proportion of excess available bandwidth based on current use, and provides this information to the media access controller.

Additional objects, advantages, and features of the present invention will become apparent from the following description and appended claims, taken in conjunction with the accompanying drawings.

DETAILED DESCRIPTION OF THE PREFERRED EMBODIMENTS

Figure 1:
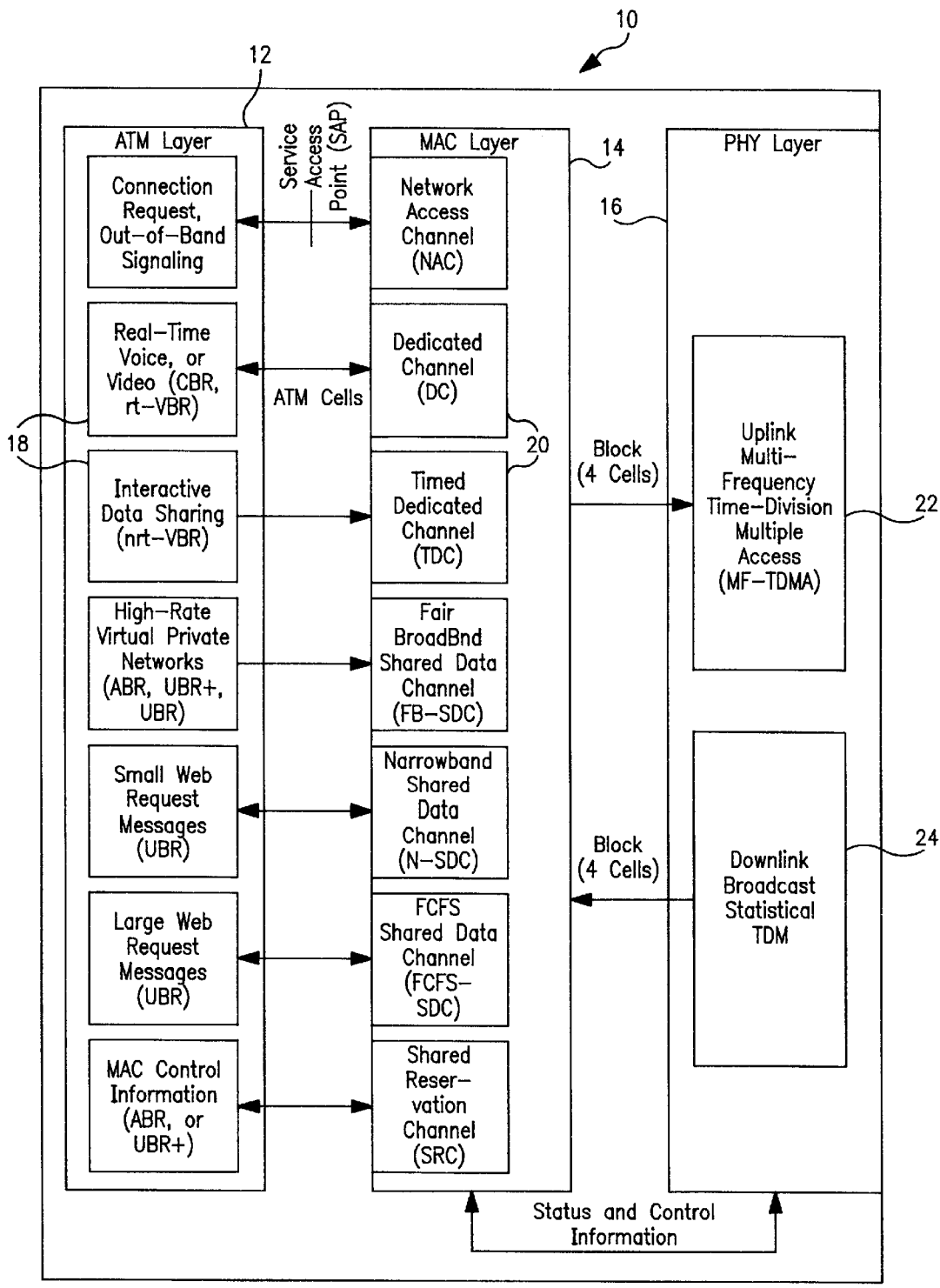
FIG. 1 is a block diagram of a layer architecture structure of a user Earth terminal (UET)

The following discussion of the preferred embodiments directed to an onboard demand assigned multiple access protocol for a processing communications satellite network is merely exemplary in nature, and is in no way intended to limit the invention or its applications or uses.

The present invention is a reservation DAMA protocol of the type referred to above that allows multiple bursty users of a sharing set to concurrently use a single uplink TR in a communications system. A sharing set is the set of users that are currently assigned to the same TR. The DAMA protocol will control reservations for multiple sharing sets each including multiple users. The reservation DAMA of the invention uses the general variation that it is controlled onboard the satellite to regulate the DAMA and the reservations. Because the control is onboard the satellite, the DAMA protocol is referred to herein as a centralized broadband fair DAMA (C-BFD) protocol. The essence of the method is that the DAMA control on the satellite maintains a reservation log which identifies, for each sharing set, the number of uplink time slots that are currently reserved by one or more members of the sharing set and the next available uplink time slot (NAUTS) for reservations. Identifying the NAUTS is important so that the DAMA processor knows when the next channel slot will be available to transmit a reserved data transmission based on existing reservations. The satellite DAMA processor maintains a time offset, so that the NAUTS are expressed as the times that will apply at the user Earth terminal (UET) after a reservation grant message (RGM) arrives in the downlink signal.

All of the users in a sharing set are free to bid for reserved time slots using reservation query messages (RQMs), which are sent to the satellite addressed to the satellite's DAMA processor in the shared contentious control flow on the uplink TR. Since the RQMs use contentious access, the standard techniques of Slotted Aloha apply, including collision detection and a retransmission strategy. Processing satellites typically use robust error control on their uplink which discards colliding RQMs. Although the satellite DAMA controller may not be explicitly aware of the occurrence of a collision, the event is implicitly detectable by the user sending an additional RQM due to the absence of an RGM on the downlink. The collision is detected by the ground terminals when the grant information is not received within an expected time window.

After the DAMA controller on the satellite receives an RQM, it buffers the requests into priority-class queues. It then decides whether to grant, deny or delay the request based on predetermined criteria, including the service and price class of the user, the amount of data already sent by the user, the number of other users with RQMs in the queue, and the congestion state of the destination downlink port. The algorithm used to process the RQMs into RGMs can be any algorithm suitable for the purpose described herein, and can be a hybrid between the priority-oriented demand assignment (PODA) algorithm and a fair-queuing algorithm, for example, a frame-based fair-queuing algorithm. When the RGM is sent, the satellite DAMA processor updates the NAUTS for the sharing set by the amount of slots in the reservation. The size of the reservation granted may be capped by the controller to insure access fairness among the users in the sharing set. Additionally, the satellite DAMA processor may provide congestion control by delaying or denying requests that are destined to congested ports. The type of addressing for the RQMs and RGMs, the type of TRs used for the RQMs and RGMs, and other network specifics for the DAMA protocol of the invention would depend on the particular DAMA protocol algorithm used, as would be appreciated by those skilled at the art, and may vary from network to network.

The DAMA protocol of the present invention avoids the disadvantages referred to above for the NOC based DAMA, and has a simpler and more robust synchronization capability of the reservations than is the case when the DAMA control is distributed among the members of the sharing set. While it has the same speed and efficiency advantages of the distributed case, the subject innovation requires the provision of facilities in space to provide the DAMA control.

For satellite communications networks, a media access control (MAC) layer is required between the ATM layer and the physical layer in the hierarchical structure of the processor to satisfy the dynamic nature of the ATM protocol and the multi-media traffic it carries to provide additional processing between the ATM layer and the physical layer, because ATM was not originally designed to operate over a broadcast medium. The MAC layer allows the ATM layer to operate seamlessly over the satellite network. The MAC layer essentially includes different types of MAC channels that are used to satisfy different network functional and performance requirements for a particular channel. Each separate MAC channel utilizes different user protocols depending on the purpose of the current information transfer. MAC channels are logical constructs for partitioning the physical layer bandwidth into full-duplex pipes. The MAC layer maintains logical state information based on the state of the physical layer and the state and requirements of the ATM connection, for example, waiting for a connection request acknowledgement for a real-time VBR source to determine the type of MAC channel to be used for the information transfer. The MAC layer sends configuration commands to the physical layer, including information related to the time, frequency band, and duration of the information transfer. A discussion of wireless ATM network protocol stacks can be found in Raychaudhuri, Dipankar, "Wireless ATM Networks: Architecture System Design and Prototyping," IEEE Personal Communications, August 1996, pgs. 42–49.

FIG. 1 is a block diagram of a UET 10 that includes an ATM layer 12, an MAC layer 14 and a physical layer 16. A plurality of different known ATM service classes 18 are represented in the ATM layer 12, and are mapped into a particular MAC channel 20 in the MAC layer 14. The MAC layer 14 identifies the available MAC channel 20 that would be used depending on the particular user and the type of data being transmitted. Each MAC channel has a specified protocol associated with it (e.g. FB-SDC, CBFD), allowing different protocols to be associated with each MAC channel. For example, for the ATM service class real-time voice or video, the ATM cells providing the voice or video code are mapped into a dedicated MAC channel because of the robust requirements of voice and video transmission. The protocol associated with this MAC channel is called fixed channel-slot assignment (FC-SA). U.S. patent application Ser. No. 09/232,157, titled Media Access Control Layer for Satellite ATM Networks, filed Nov. 8, 2001, and assigned to the assignee of this application, discloses MAC channel mapping of this type.

A network access channel (NAC) is used by the UET 10 when trying to gain access to the network through the NOC for the first time. The NOC responds to the UET in the reverse direction commanding the terminal to use either a dedicated channel (DC), at time-dedicated channel (TDC), a fair broadband shared data channel (FB-SDC), a first-come first-served shared data channel (FCFS-SDC), a narrowband shared data channel (N-SDC) or a shared channel (SC). The DC is used for applications requiring a constant service rate, such as voice conversation, for the duration of the connection. The TDC is used when a fixed-rate circuit is desired for apriori infinite period of time. The FB-SDC is used for high-rate, large application messages for customers concerned with getting a fair allocation of bandwidth and guaranteed QoS. The FCFS-SDC is used for high-rate, large application messages for customers who do not care about QoS and who want to minimize service costs. The N-SDC is used for small data messages, and narrowband bursty sources, such as small web requests. In general, shared channels are used when the traffic contract specifies a bursty non-real time application, such as web-surfing or LAN Interconnect. The physical layer 16 shows the multiplexing scheme for the satellite uplink and downlink, particularly a frequency division multiplex time-division multiple access (FDM-TDMA) 22 for the uplink and a broadcast statistical TDM 24 for the downlink. Each separate MAC channel 20 is assigned a predetermined uplink protocol that effectively operates for that MAC channel. These protocols include Slotted Aloha, fixed channel-slot assignment, finite-duration fixed channel-slot assignment, centralized broadband fair DAMA (C-BFD), and distributed DAMA. This invention concerns the fair broadband shared data channel using the C-BFD protocol.

Figure 2:
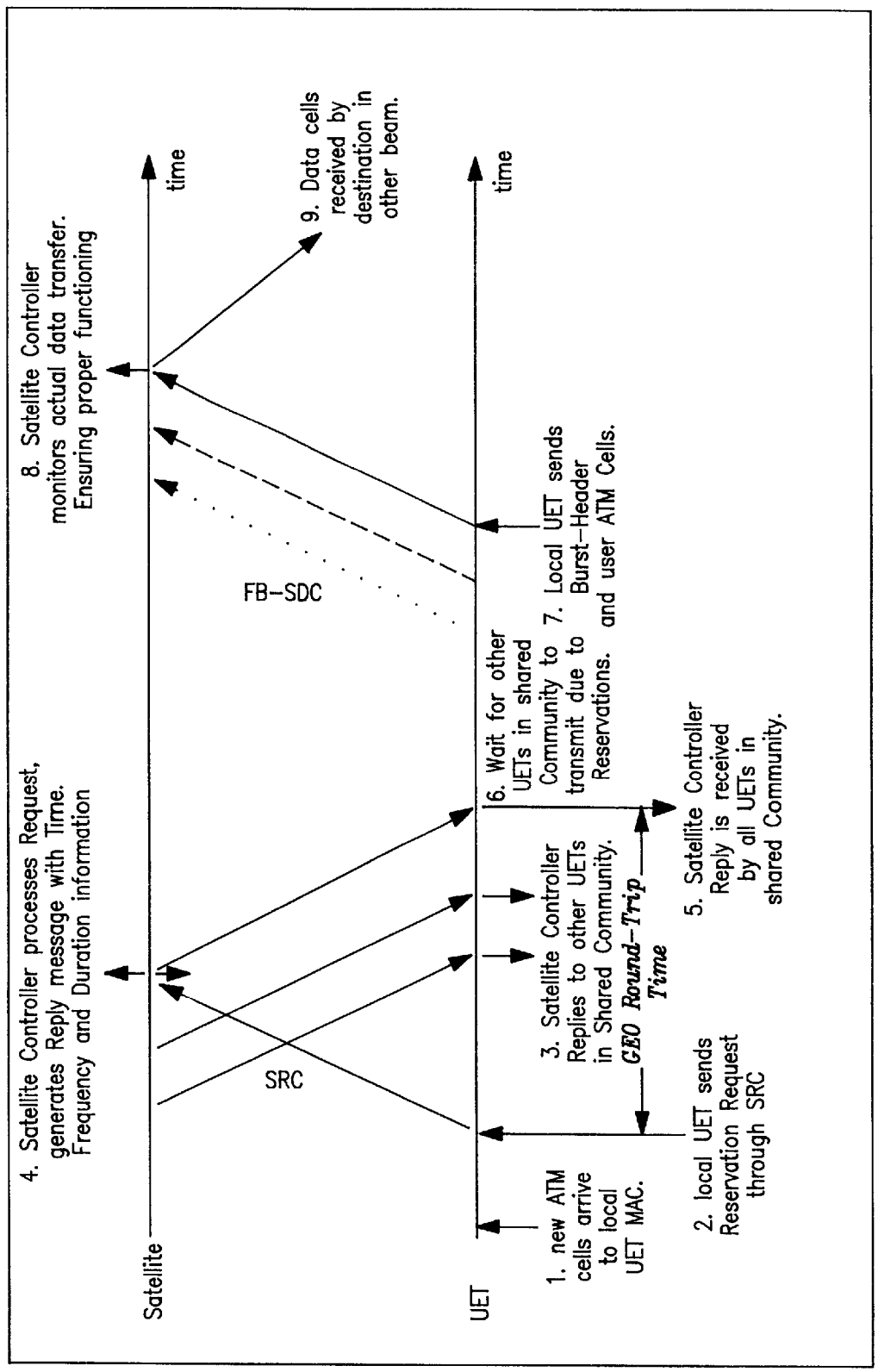
FIG. 2 is a protocol flow diagram showing operation of the centralized broad band DAMA (C-BFD) protocol, according to the invention.

FIG. 2 shows a timeline for both satellite time and UET time to depict the operation of the C-BFD protocol of the invention discussed above. Data in the form of ATM cells are sent to a media access controller (MAC) in the UET to be transmitted on the satellite uplink at some time, as indicated by time 1 on the UET timeline. At this time, it is assumed that the UET has been admitted to a sharing set in the network, the NOC has assigned it a shared reservation channel (SRC), and an ATM connection has been established between the source and destination terminals. The SRC is the contentious shared transition resource that all of the users of the sharing set transmit reservation requests. Sometime later, the UET sends an RQM on the SRC, using, for example, a Slotted Aloha protocol. The RQM will include information of the number of ATM cells to be transmitted, or the number of channel slots needed for the reservation. While the UET is waiting for the return RGM, it may be receiving other RGMs transmitted by the satellite on the downlink to other UETs in the sharing set, as indicated by time 3.

At time 4, the satellite receives the RQM from the UET and then processes the reservation request. The DAMA controller queues the requests, sorts them based on their service time, and replies to the UET based on currently available network status information. The reply may be the RGM giving the time, frequency and duration of the reserved transmission time, or instructions to wait a specific amount of time due to the onset of congestion at the destination port, or a refusal due to congestion. There is a processing delay in the satellite because of satellite processing between the time the satellite receives the RQM and transmits the RGM. At time 5, the RGM is received by the UET, as well as all of the other UETs in the sharing set. If the UET does not receive the RGM within a predetermined time period, it will know that its RQM collided with another RQM from another UET in the sharing set, and after a randomized delay, will retransmit the same RQM.

The UET will wait the predetermined time to transmit the data based on the information received in the RQM. In the meantime, other UETs in the sharing set will be transmitting their data on their reserved TRs, as indicated at time 6. When the NAUTs for the UET arrives, the UET will transmit its ATM cells to the satellite over the contention free fair broadband shared data channel (FB-SDC), as indicated by time 7. The first cell (burst header) in the data burst transmission is a status message from the UET to the satellite controller describing the assumed characteristics of the current data transfer (i.e., state of the UET), including start-time, frequency, duration, rate or amount of data transfer. It should be noted that if the local UET requires more bandwidth resources than was originally requested, it may piggyback a request message to the controller as part of the data stream that has already been allocated. In other words, instead of sending a new RQM for additional data transfer, the UET may transmit the RQM as part of the reserved data transfer to reserve a future available non-contentious reservation time slot. Sometime later, the satellite controller will receive the ATM cells from the UET, and will monitor actual data transfer, insuring proper functioning, as indicated by time 8. This stage of the protocol is for fault detection, isolation and recovery, enabling the MAC controller to shut down a malfunctioning UET. The satellite will switch the data cells to the particular destination downlink for transmission of the data back to the Earth to be received by the destination UETs, as indicated by time 9.

Figure 3:
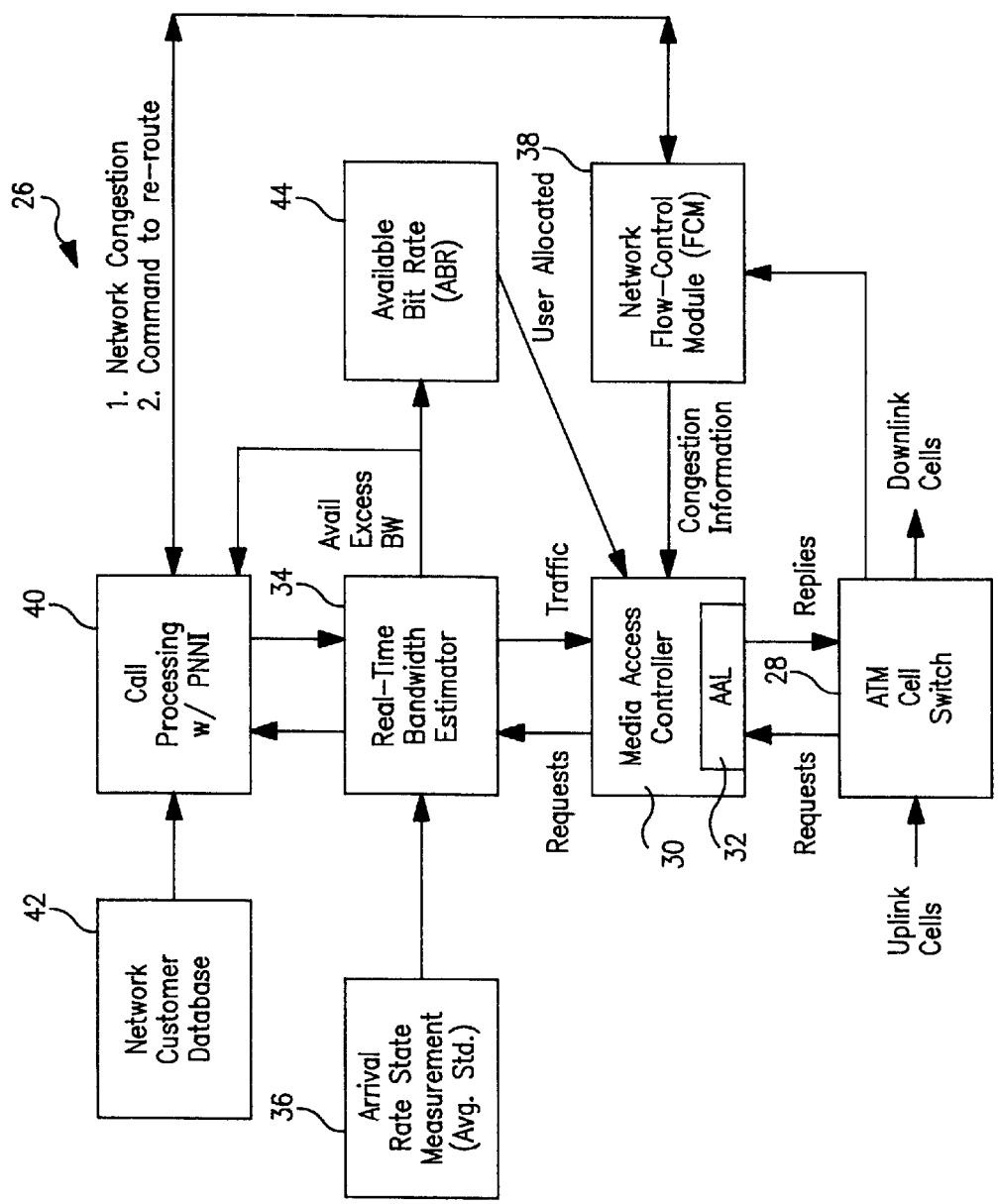
FIG. 3 is an onboard processing functional block diagram depicting the operation of the invention.

FIG. 3 is a block diagram of a satellite processing system 26 showing processing functions on the satellite. The uplink ATM cells from the users of the network are received at an ATM cell switch 28 that provides ATM cell processing on the satellite. Particularly, the cell switch 28 determines which cells are RQMs, and which cells are data transmissions and other functions. The data cells are directly switched by the switch 28 to the proper satellite downlink. For example, the switch 28 would route the data cells to the antenna that covered the desired Earth coverage area for the particular address in the cell. The satellite would include an ATM switch with several input and output ports that route the various data cells to the appropriate satellite downlink based on the destination address.

The uplink cells that are RQMs are routed by the switch 28 to a media access controller (MAC) 30. As will be discussed below, the basic function of the MAC 30 is to determine if the RQM will be granted, delayed or denied, and, based on various requirements of data transmission, what type of reservation will be granted. The MAC 30 includes an ATM adaption layer (ML) 32 that is between the ATM layer and an interface for interfacing the ATM layer. Different MAC channels are available in the MAC 30 to assign the data transfer to.

The MAC 30 receives input information from various systems on the satellite to process the RQM. The system 26 includes a real-time bandwidth estimator module 34 that determines the available capacity for each and every priority class or connection and the aggregate bandwidth to be transmitted on the satellite downlink. To maintain the network QoS, it is important to monitor whether a potential user of the network will effect the QoS for the already existing users by various types of delays. Therefore, the module 34 estimates the on-board capacity per beam being transmitted to each destination. The effective capacity or bandwidth per beam is provided as an input to the estimator module 34 from a processor 36 which takes measurements of the average and standard deviation of the arrival rates of each priority-class and the beam as a whole. The estimator module 34 receives the information of the current uses per beam in the satellite, and determines whether a new user will effect the performance for the existing uses, as well as himself. This process is part of the call admission control (CAC) procedure used in ATM networks.

The system 26 further includes a flow-control module (FCM) 38 that senses congestion in the destination ports to monitor the traffic accordingly. The FCM 38 has knowledge of the congestion state of the switch 28, and all of the elements connected to it. This enables the FCM 38 to suggest a slowing down to a particular port or a particular connection. If the FCM 38 determines that a particular destination port is congested, it will instruct the MAC 30 accordingly, and the MAC 30 may decide to deny the reservation request, delay the reservation request, or some other suitable processing decision based on the information. The FCM 38 would also receive congestion information from other switches (not shown) on the network connected to it, and would relay that information to the MAC 30. In general, requests that are destined to congested ports are rejected. Requests that are destined to ports which are in the "onset" of a congestion state are granted transmission after a suitable wait time suggested by the FCM 38 to minimize the impact of the new data stream on the problem port. Uplink congestion control may also be exercised by the FCM 38 by re-assigning users to different MAC channels depending on the current availability of a new bandwidth. The FCM 38 gives the MAC 30 a suggested course of action for each destination port in the network.

A call processor module 40 with private network-to-network interfacing (PNNI) is provided, and monitors the entire network for transmission of data. Congestion information flows between the various terminals of the network so that this information can be shared throughout the network. Therefore, congestion information from other network sources or destinations would be provided to the FCM 38, and likewise, congestion information from the switch 28 that is sent to the FCM 38 will be applied to the processor module 40. Thus, the system 26 can re-route calls based on system congestion throughout the network. For example, if there are two gateway terminals at a particular destination, the processor module 40 will know if one or the other of the terminals is congested, and will instruct the system 26 to re-route the call to the uncongested gateway terminal. A network customer database 42 includes a current list of the network customers, and this information is provided to the processor module 40.

One of the outputs from the estimator module 34 is the available excess bandwidth for each downlink beam. This output is applied to an available bit rate (ABR) processor module 44. The available bit rate is a standard ATM service that identifies the bandwidth that is available for each user on the uplink. The processor module 44 calculates the proportion of the excess bandwidth to be given to the pool of users, and passes this information on the MAC 30. The available bit-rate information is sent to the MAC 30 as an input to determine whether a reservation request will be granted. The MAC 30 reapportions the available uplink bandwidth to the multiple users of a sharing set that are requesting use of a particular TR.

The onboard uplink scheduling uses by the C-BFD protocol of the invention, which includes a hierarchical uplink fair scheduling (HUFS) in the MAC 30. The HUFS enables the dynamic partitioning of the uplink bandwidth into wholesale and retail components, while ensuring that unused bandwidth is reapportioned to backlogged wholesalers and retailers. In other words, the HUFS sets the priority for a reservation grant based on the type and service class of user, i.e. wholesaler, retailer, independent etc., and reapportions the available bandwidth to the lower priority users when the higher priority users are not actually using the bandwidth. Known fair queuing algorithms can be found in Bennett, Jon C. R., et al. "Hierarchical Packet Fair Queuing Algorithms," Proc. of the ACM-Sigcomm 96, Palo Alto, Calif, August 1996, pp. 143–156 and Varma, Anujan, et al., "Hardware Implementation of Fair Queuing Algorithms for Asynchronous Transfer Mode Networks," IEEE Communications Magazine, December 1997, pgs. 54–68. Also, see U.S. patent application Ser. No. 09/270,356, titled Hierarchical Downlink Scheduler for a Processed Satellite Payload, filed Nov. 8, 2001, and assigned to the assignee of this application. A similar scheme can be used for the downlink, as well as other switches in the path from source to destination. The HUFS must be executed for every uplink in fixed size quanta for each of the FB-SDC frequency channels. This capability has also been called "resource fencing."

The basic HUFS algorithm is divided into two stages, although any number of stages may be used to expand the service. The first stage provides wholesale user selection and the second stage provides retail user selection. Both stages employ a form of packet fair queuing (PFQ), such as the starting potential fair queuing (SPFQ) algorithm. The first and second stages are independent and unique for each uplink band. The first stage queues are actually virtual queues storing the state of each wholesaler group and may be either backlogged or idle. The second stage queue is a virtual queue storing fixed sized virtual packets representing a number of some quanta of uplink bandwidth desired by the retail user connection.

Figure 4:
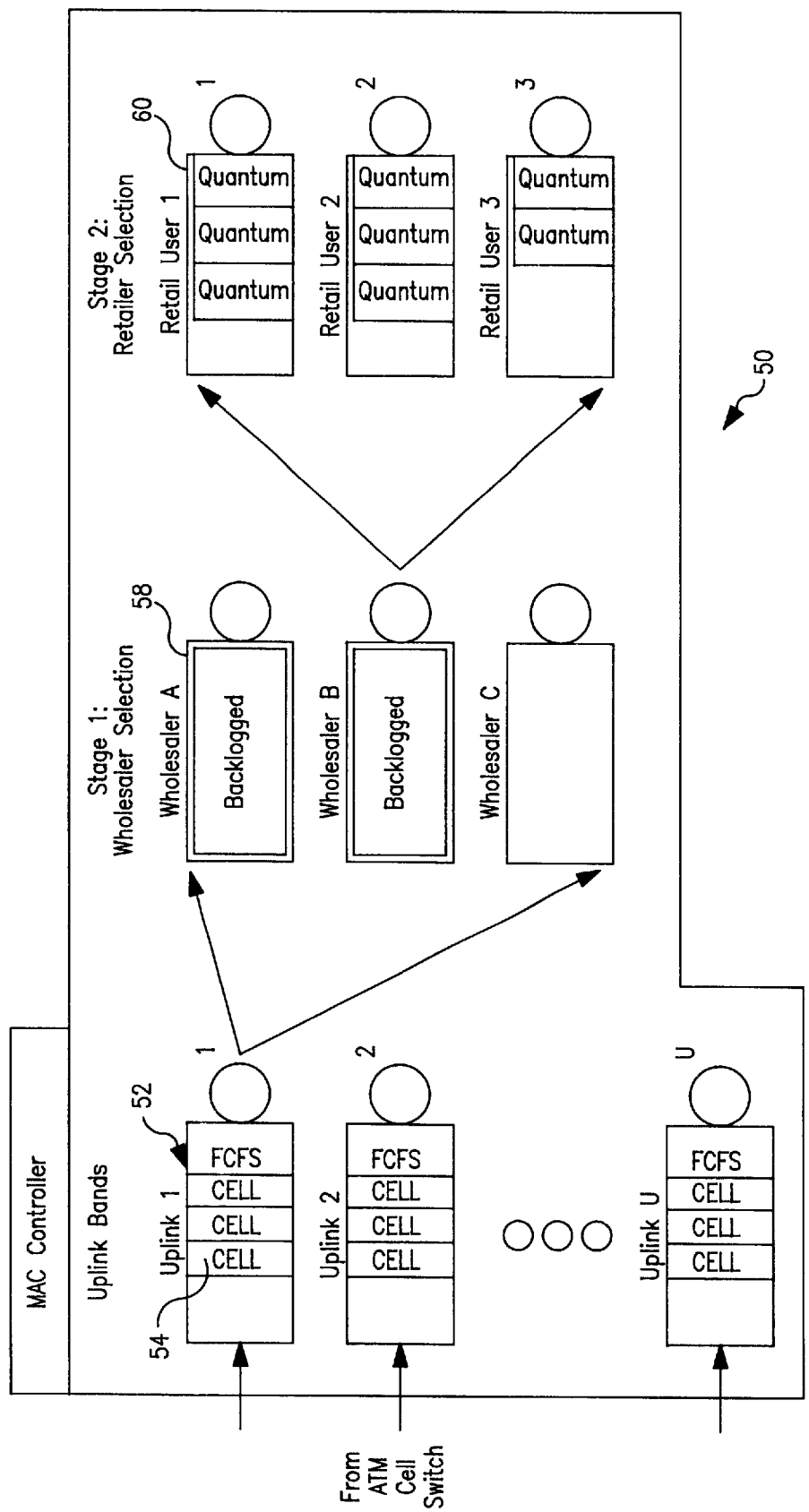
FIG. 4 is a block diagram depicting a hierarchical uplink fair scheduling technique according to the invention.

FIG. 4 is a block diagram 50 depicting the HUFS of the invention. A plurality of uplink bands 52 are shown, where each band 52 includes a stream of ATM reservation request cells 54. Each ATM cell 54 in a band 52 is received and processed in order by an MAC agent (one per uplink band) and is subsequently distributed to a queue identifying a wholesaler 58. The queue holds the RQMs for retailers 60 for that particular wholesaler 58. As shown, some of the wholesalers 58 are backlogged with retailers 60 waiting for service by the PFQ scheduler. The PFQ scheduler calculates cost functions based on subscription rate and bandwidth utilized in the past. The resulting metric is used for determining a winner by sorting. The winner of the competition will herein be called the "highest priority." The highest priority wholesaler that includes the retailers 60 waiting for service is selected in a first stage, and the highest priority retailer 60 of the selected wholesaler 58 is determined in a second stage. An RGM message is generated by the MAC controller after a winner has been selected at service time.

Figure 5:
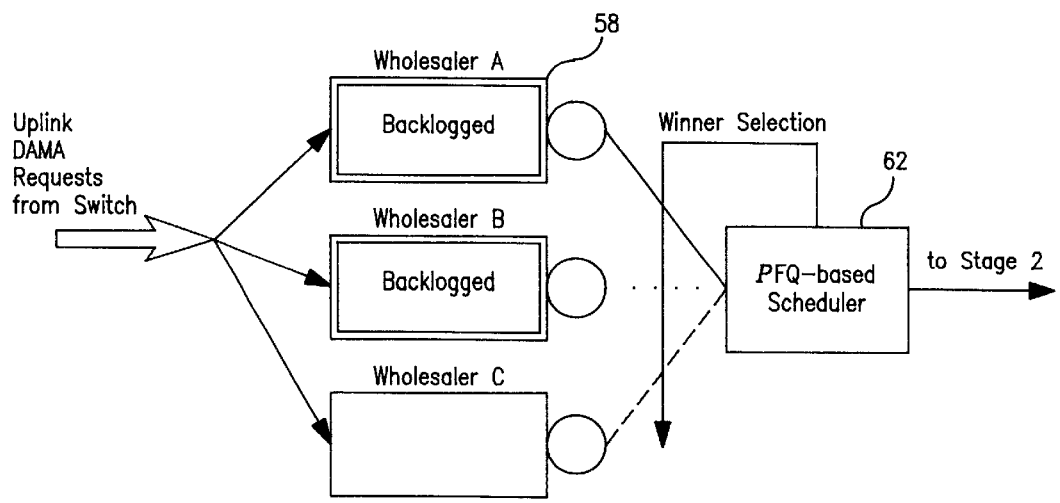
FIG. 5 is a block diagram showing a wholesaler selection stage of the hierarchical uplink fair scheduling technique.

FIG. 5 is a block diagram depicting the wholesaler selection stage, where the highest priority wholesaler 58 having a RQM is selected based on a measure of past service, the wholesaler's subscription rate, and its relation to other wholesalers by a PFQ scheduler 62. The PFQ can be any suitable packet fair queuing algorithm known in the art. An output of the scheduler 62 is the highest priority wholesaler 58 having a backlog of retailers 60 waiting for an RGM to be generated at the PFQ service time.

Figure 6:
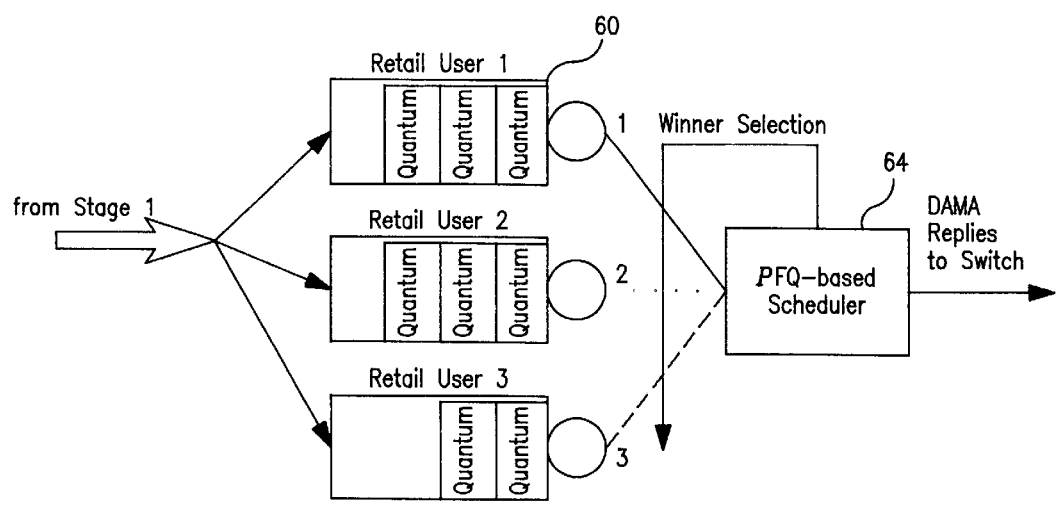
FIG. 6 is a block diagram showing a retailer selection stage of the hierarchical uplink fair scheduling technique.

Once the highest priority wholesaler 58 is determined, the highest priority retailer 60 for that wholesaler 58 is determined for the retailers currently having a reservation request. FIG. 6 is block diagram showing the retail user's selection for the retail selection stage, where the retail users 60 considered are customers of the winning wholesaler. The highest priority customer is selected by the same PFQ scheduler 64 based on its subscription rate, past service received and its relation to the customer's PFQ cost metric (virtual times). In a preferred embodiment, the schedulers 62 and 64 are the same scheduler.

In both stages, a virtual time is estimated and is used for each member of the contention pool in ascending order. The member of the pool at the top of the sorted list wins the priority contest, and is selected to move on to the next module. An example of a packet fair queuing concept using an idealized fluid model scheduler generally referred to as a Generalized Processor Sharing (GPS), for both the first and second stages described above is given below. Each member of a contention pool reserves a fraction of the available shared bandwidth. The virtual time (VT) is a global variable that is used to keep track of the amount of work performed by the scheduler 62 for each member of a pool that is contending for bandwidth resources. The VT is used to generate a time-stamp which is used as a key for sorting, and is a piece-wise monotonically increasing linear function. The variable M is the slope of VT which depends on the number of backlogged members of the pool B($\tau$,t). For example, the second stage backlog implies that the connection has at least one cell waiting N, in the time interval ($\tau$, t). The variable M is determined as follows:

$$r_u <= \frac{C_{df,u}}{C_{df}} C_{link}, \text{ where } C_{df} = \sum_{u=1}^{N} C_{df,u} \qquad 1$$

$$m = \frac{\sum_{j=1}^{N} C_{df,j}}{\sum_{i \in B(\tau,t)} C_{df,i}}$$

Three connections 1, 2 and 3 share the bandwidth $C_{link}$= 100,000 cells/sec. The connection 1 has 50% of the bandwidth, and the connections 2 and 3 each have 25% of the bandwidth. The scheduler 62 is idle at t=0, and packets of the ATM cells 54 arrive at times t. At t=0, an ATM cell 54 is buffered from the connection 1, and begins service immediately at the full link rate, $\rho_1$=1.0, $r_1$=$\rho_1$*$C_{link}$=100K cells/sec, and the slope=1/0.5=2. At t=2 $\mu$s, a cell 54 is buffered from the connection 2, and the GPS adjusts the service rates to $\rho_1$=0.5/(0.5+0.25)=0.667, $\rho_2$=0.25/(0.5+0.25)=0.333, and the slope=1/(0.5+0.25)=1.33. Thus, the connections 1 and 2 receive 1.33 more bandwidth. At t=4 $\mu$s, a cell 54 is then buffered from the connection 3 and the GPS adjusts the service rates to their allocated rates of slope=1/(0.5+0.25+0.25)=1.0, $\rho_1$=0.5/(0.5+0.25+0.25)=0.5, $\rho_2$=0.25/(0.5+0.25+0.25)=0.25, $\rho_3$=0.25/(0.5+0.25+0.25)=0.25. A similar example can be found in Varma, Stiliadis, "Hardware Implementation of Fair Queuing Algorithms for Asynchronous Transfer Mode Networks."

Therefore, in short, each member of the contending pool is allocated a bandwidth in proportion to its subscription service rate. If all the members are backlogged, then each member is given its subscription service rate. If some of the members are idle, the excess bandwidth is partitioned among the backlogged members in proportion to their relative subscription rates.

The C-BFD protocol described above provides a number of advantages for the fair distributed use of system resources. These advantages include:

1. Supports efficient usage of the uplinks by a set of bursty users.
2. Well adapted to use with ATM (Asynchronous Transfer Mode) protocols.
3. Facilitates satellite network to guarantee end-to-end ATM QoS over shared channels.
4. Resource Fencing (a) gives the ability to sell bandwidth wholesale for bursty variable bit-rate (VBR) sources, while b) guaranteeing that users will get what they paid for when the network is busy, but c) allows unused bandwidth to be redistributed amongst wholesalers based on their subscription rate.
5. Wholesaler and retailer separation into two stages allows flexibility of implementation. The capability to use different fair queuing algorithms on each stage allows a design which can achieve a variety of complexity and fairness criteria.
6. Fair uplink bandwidth allocation amongst users (allocation is proportional to subscription rate) ensured by a single controller.
7. Capability for common scheduler algorithm with downlink fair scheduler (similar ASIC) design.
8. The fair scheduling algorithm used on the uplink provides the following:
   Isolation of flows—misbehaving users are separated from compliant users;
   Tight and guaranteed delay bounds for QoS;
   Fairness—service is given to users in proportion to subscription rate; and
   SPFQ is a scaleable algorithm to higher rates because complexity is proportional to O(log(N)).
9. Not all uplinks are required to use the protocol, only heavily utilized uplinks.
10. Congestion and Flow-Control including an onboard DAMA controller with the knowledge of the network congestion state, enables a flow-control implementation.
11. Flow-Control function minimizes the buffer size requirements for the onboard payload by limiting the transmission to congested ports.
12. "Backward" compatible with ground-based distributed DAMA design.
13. Flow-Control enables the implementation of a fully connectionless protocol transfers (i.e. connections that do not go through a call-admission phase).
14. Onboard controller enables the efficient implementation of ATM available bit rate (ABR) service class.
15. Enables different pricing classes due to different delay performance guarantee.
16. Centralized controller is able to optimally reallocate MAC channels based on traffic model, interference model, coding-rate changes (due to rain) and newly available uplink channels.
17. Centralized processing gives robust control of shared-community database compared to the distributed algorithm.
18. Flexibility—onboard centralized controller processing allows the network to adapt quickly to changing congestion states, call-level traffic (new BW available) and coding-rate changes (e.g. due to rain or sun).
19. Single hop delay for non-colliding reservation requests—replies.
20. Piggybacking of additional requests into current allocation reduces contention in the SRC.
21. Statistical response-time performance controlled by a centralized controller by limiting the number of users per SRC.
22. Highly Efficient use of full uplink bandwidth possible for set of users with large data transfer needs or high bandwidth on demand.
23. Control messages are not hardwired into the slot or frame format (i.e. control messages in ATM payload field), therefore bandwidth is not wasted if not used.
24. Uplink bandwidth resource onboard control results in higher revenue generation compared to ground control because the time to reallocate unused bandwidth to a new transfer is minimized (potentially only one round-trip to set up a data transfer, instead of two).
25. DAMA control and data channels are not customized (same as regular channels)

It should be noted that the aggregate performance of the on board centralized DAMA protocol is roughly the same as a distributed DAMA Protocol for same pricing and for independent and identically distributed homogenous traffic (all users behave statistically in the same way, and there's only one kind of user), except for an additional processing delay for the controller; therefore, new numerical performance examples will not be included here. The proposed centralized controller enables different quality-of-service to be delivered to non-homogeneous sources.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A demand assigned multiple access system for coordinating the transmission of data on a processing satellite uplink and downlink in a satellite communications network, said system comprising:
   a user Earth terminal, said user Earth terminal including a media access control layer including a plurality of media access control channels for transmitting data on the uplink, wherein one of the control channels is a contentious shared reservation channel and one of the control channels is a non-contentious shared data channel, said terminal transmitting a reservation request to the satellite on the contentious control channel to bid for an available time slot to transmit the data on the non-contentious shared data channel;
   at least one cell switch positioned on the satellite and receiving the uplink transmissions from the terminal on the satellite uplink, said at least one switch identifying the reservation request; and
   a DAMA processor positioned on the satellite and receiving the reservation request from the cell switch, said processor processing the reservation request to determine whether to grant, deny or delay the reservation request based on predetermined criteria, said processor generating a reservation grant message to be transmitted on the satellite downlink that includes information of the time, frequency and duration for transmitting the data on the non-contentious shared data channel if the request is granted.

2. The system according to claim 1 wherein the plurality of control channels include a network access channel, a dedicated channel, a time dedicated channel, a fair broadband shared data channel, a narrow-band shared data channel, a first-come first-served shared data channel and a shared reservation channel.

3. The system according to claim 1 further comprising a real-time bandwidth estimator module positioned on the satellite that determines the available capacity in the satellite downlink and sends a signal indicative of the available capacity to the DAMA processor.

4. The system according to claim 1 further comprising a flow-control module positioned on the satellite that senses congestion in a destination port for the data and sends a signal indicative of the congestion state to the DAMA processor.

5. The system according to claim 4 further comprising a call processor module including private network-to-network interfacing positioned on the satellite that monitors information flow throughout the network, and provides a signal to the flow-control module indicative of the information flow, said private network-to-network interfacing having knowledge of the topology of the network.

6. The system according to claim 1 further comprising an available bit rate processor positioned on the satellite that identifies the available bit rate in a standard ATM service available on satellite uplink and downlink destinations, and sends a signal indicative of the available bit rate to the DAMA processor.

7. The system according to claim 1 wherein the DAMA processor includes a scheduler that determines a highest priority wholesaler from a plurality of users using the shared data channel by a packet fair queuing algorithm that selects the highest priority wholesaler based on a measure of the wholesaler's past service, the wholesaler's subscription rate, and the wholesaler's relation to other wholesalers.

8. The system according to claim 1 wherein the scheduler uses the packet fair queuing algorithm to determine a highest priority retailer associated with the highest priority wholesaler.

9. A processing system on a satellite for processing a demand assigned multiple access protocol for transmitting data on a satellite uplink and downlink in a satellite communications network, said system comprising:
  a switch receiving satellite uplink signals on the satellite uplink, said switch identifying reservation requests that reserve an available time slot on a transmission resource on the satellite uplink; and
  a media access controller responsive to the reservation requests from the switch, said media access controller determining whether to grant, deny or delay the reservation requests based on a plurality of predetermined criteria including the available bandwidth capacity in the satellite downlink, the number of other users using the transmission resource, and data flow congestion in the network, said media access controller sending a reservation reply message to the switch and the switch sending the reservation reply message on the satellite downlink.

10. The system according to claim 9 wherein the media access controller includes a scheduler that identifies the class of user from a plurality of users using the transmission resource.

11. The system according to claim 10 wherein the scheduler determines a highest priority wholesaler of the plurality of users using the transmission resource by a packet fair queuing algorithm that selects the highest priority wholesaler based on a measure of the wholesaler's past service, the wholesaler's subscription rate, and the wholesaler's relation to other wholesalers.

12. The system according to claim 11 wherein the scheduler uses the packet fair queuing algorithm to determine a highest priority retailer associated with the highest priority wholesaler.

13. The system according to claim 9 further comprising a real-time bandwidth estimator module that determines the available capacity in the satellite downlink and sends a signal indicative of the available capacity to the media access controller.

14. The system according to claim 9 further comprising a flow-control module that senses congestion in a destination port and sends a signal indicative of the congestion to the media access controller.

15. The system according to claim 9 further comprising a call processor module including private network-to-network interfacing that monitors information flow throughout the network, and provides a signal to the flow-control module indicative of the information flow, said private network-to-network interfacing having knowledge of the topology of the network.

16. The system according to claim 9 further comprising an available bit rate processor that identifies the available bit rate in a standard ATM service available on the satellite uplink and downlink destinations, and sends a signal indicative of the available bit rate to the media access controller.

17. A demand assigned multiple access system for coordinating the transmission of data from a processing satellite uplink and downlink in a satellite communications network, said system comprising:
  a user Earth terminal, said user Earth terminal including a media access control layer including a plurality of media access control channels for transmitting data on the uplink, wherein one of the control channels is a contentious shared reservation channel and one of the control channels is a non-contentious shared data channel, said terminal transmitting a reservation request to the satellite on the contentious control channel to bid for an available time slot to transmit the data on the non-contentious shared data channel;
  at least one switch positioned receiving the uplink transmissions form the terminal on the satellite uplink, said switch identifying the reservation request and routing the request in the satellite;
  a media access controller responsive to the reservation request from the switch, said media access controller determining whether to grant, deny or delay the reservation request based on a plurality of predetermined criteria, said media access controller generating a reservation reply message to be sent on the satellite downlink;
  a real-time bandwidth estimator module that determines the available capacity in the satellite downlink and sends a signal indicative of the available capacity to the media access controller;
  a flow-control module on the satellite that senses congestion in a destination port and sends a signal indicative of the congestion to the media access controller; and
  an available bit rate processor that identifies the available bit rate in a standard ATM service available on the satellite uplink and downlink destinations, and sends a signal indicative of available bit rate to the media access controller.

18. The system according to claim 17 further comprising a call processor module including private network-to-network interfacing that monitors information flow throughout the network, and provides a signal to the flow-control module indicative of the information flow, said private network-to-network interfacing having knowledge of the topology of the network.

19. The system according to claim 17 wherein the media access controller includes a scheduler that determines a highest priority wholesaler from a plurality of users using the shared data channel by a packet fair queuing algorithm that selects the highest priority wholesaler based on a measure of the wholesaler's past service, the wholesaler's subscription rate, and the wholesaler's relation to other wholesalers.

20. The system according to claim 17 wherein the scheduler uses the packet fair queuing algorithm to determine a highest priority retailer associated with the highest priority wholesaler.

21. A method for transmitting data on a processing satellite uplink in a satellite communications network, comprising the steps of:
sending a reservation request by a requesting user on a control flow channel of the satellite uplink to bid for an available slot to transmit data on a main flow channel;
processing the reservation request in the satellite to determine whether to grant, deny or delay the reservation request based on the service and price class of the requesting user, the amount of data already transmitted by the requesting user, the number of other users using the main flow channel, the congestion state of a destination downlink port for the data, the available bandwidth capacity of the satellite downlink, and the flow rate of data through the satellite network;
transmitting a reservation message on a satellite downlink to the requesting user of the satellite's decision to grant, deny or delay the reservation request, wherein if the reservation message is a reservation grant message, the reservation grant message includes information of the time, frequency and duration for transmitting the data on the main flow channel; and transmitting the data on the main flow channel when the time for transmitting the data arrives.

22. The method according the claim 21 further comprising the step of determining that the reservation request collided at the satellite with a reservation request from another user if the reservation grant message is not received within a predetermined time period.

23. The method according to claim 21 further comprising the step of randomizing, delaying and resending the reservation request after the timed period has expired.

24. The method according to claim 21 wherein processing the reservation request includes the step of using a hierarchical uplink fair scheduling technique to prioritize users of the transmission resource based on instantaneous state information.

25. The method according to claim 24 wherein processing the reservation request includes the step of determining a highest priority wholesaler in a first stage and determining a highest priority retailer associated with the highest priority wholesaler in the second stage.

26. The method according to claim 21 wherein processing the reservation request includes the steps of determining the highest priority wholesaler in the first stage and the highest priority retailer in the second stage using a packet fair queuing algorithm to select the wholesaler based on a measure of the wholesaler's past service, the wholesaler's subscription rate, and the wholesaler's relation to the other wholesalers and to select the retailer by its subscription rate, past service received and relation to a cost metric of the packet fair queuing algorithm.

* * * * *